Patented Feb. 9, 1932

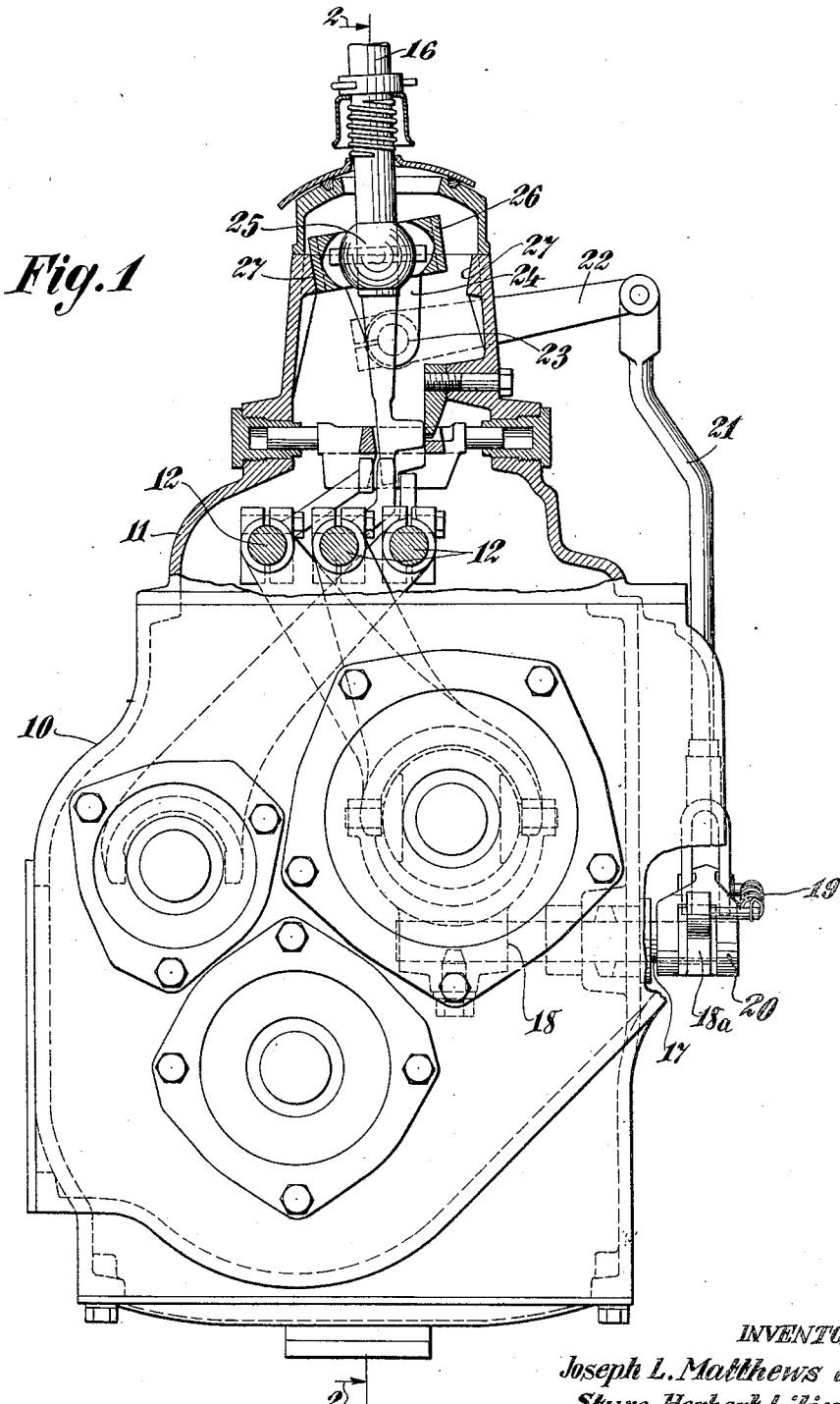

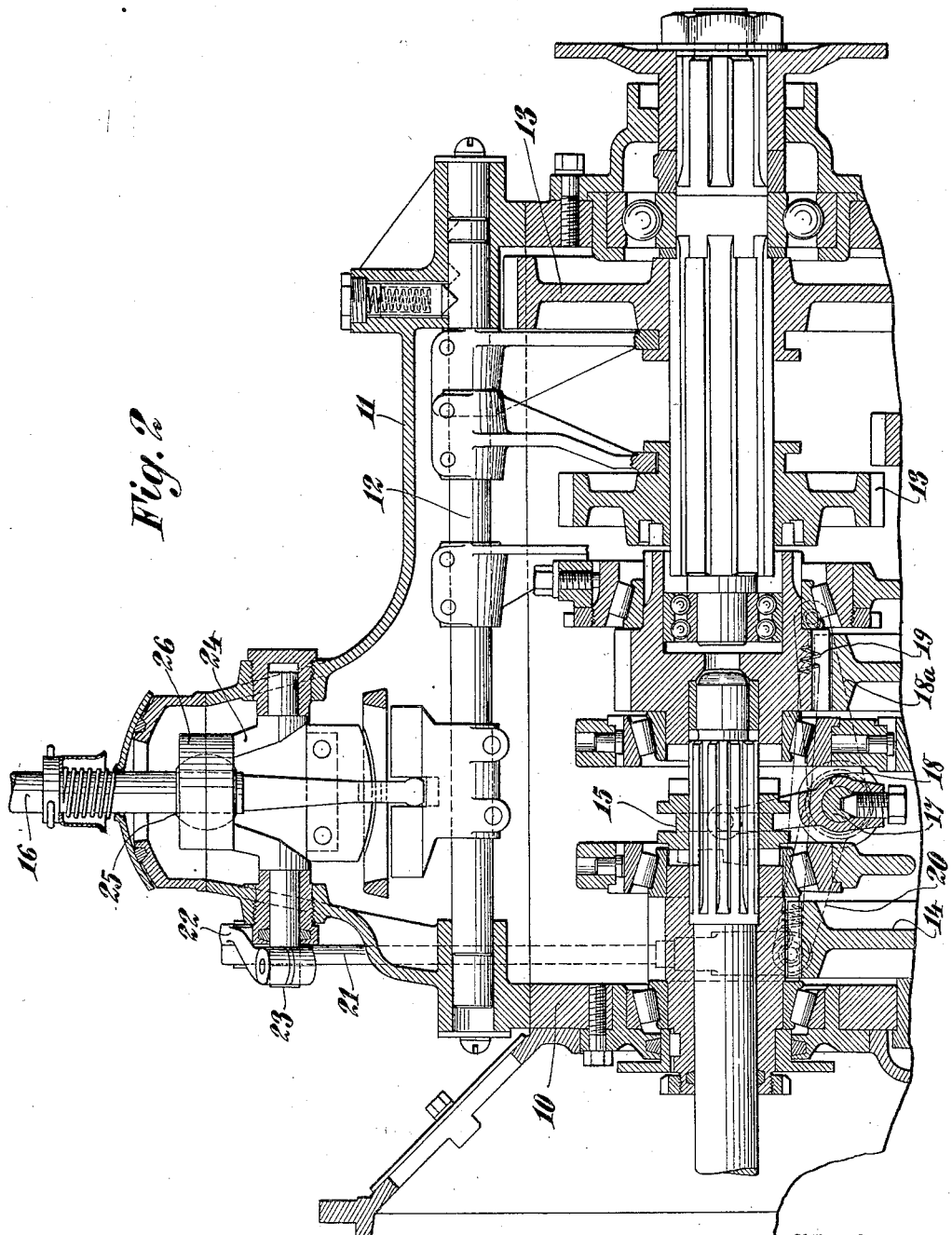

1,844,292

UNITED STATES PATENT OFFICE

JOSEPH L. MATTHEWS AND STURE HERBERT LILJEROTH, OF HIGHLAND PARK, NEW JERSEY, ASSIGNORS TO INTERNATIONAL MOTOR COMPANY, OF NEW YORK, N. Y., A CORPORATION OF DELAWARE

SHIFTING MECHANISM FOR MULTISPEED TRANSMISSIONS

Application filed May 9, 1931. Serial No. 536,208.

The present invention relates to transmission mechanisms for motor vehicles and embodies, more specifically, an improved controlling mechanism for motor vehicle transmissions of the type having two sets of gears which are shifted independently to effect a multiplication of the number of speed changes afforded by one of the sets.

In the type of change speed mechanism now commonly termed a multi-range transmission, an additional gear set or sets are placed ahead or in back of the main transmission and must be shifted in a predetermined fashion to provide the desired speed changes of the mechanism. Inasmuch as each of these transmissions must be shifted by an independent mechanism, considerable difficulty has been experienced in providing a suitable control mechanism for effecting the shifting of the independent mechanisms. The objection to providing an additional gear shift lever will be readily apparent and an object of the present invention is to provide a controlling mechanism for transmission of the above character wherein a single shift lever may be utilized to provide the desired shifting operations for the two mechanisms.

A further object of the invention is to provide a controlling mechanism of the above character wherein a unitary shift lever is so mounted that its movement effectively controls the two mechanisms described above.

Further objects, not specifically enumerated above, will be apparent as the invention is described in greater detail in connection with the accompanying drawings, wherein:

Figure 1 is a view in end elevation, looking from the right in Figure 2, partly broken away and in section to illustrate a controlling mechanism constructed in accordance with the present invention.

Figure 2 is a view in section, taken on line 2—2 of Figure 1, and looking in the direction of the arrows.

Referring to the above drawings a transmission housing is shown at 10 and is provided with a cover 11 within which selector shafts 12 are slidably mounted in the usual fashion. The interior of the housing contains a plurality of shiftable gears 13 constituting one transmission and a plurality of aligned constant mesh gears 14 which are controlled by a sliding clutch 15, the constant mesh gears and clutch 15 constituting the other set of gears. The control of the gears 13 is in accordance with standard practice and further description thereof will not be made herein, inasmuch as it constitutes no part of the present invention. Suffice it to say that the usual shifting lever 16 is mounted in the cover 11 to engage the respective selector shafts in a well known fashion to effect the shifting of the gears 13.

A transverse shaft 17 is journaled in the housing 10 and has secured thereto a forked arm 18 which engages the clutch 15. To the shaft 17 is keyed an arm 18$^a$, to the end of which a spring 19 is connected. A second arm 20 is journaled on the shaft 17 and has its other end connected to the free end of spring 19. In this fashion, the clutch 15 is loaded and, when the arm 20 passes dead center, the clutch 15 is snapped over to engage the opposite mating clutch teeth to change the gears of the auxiliary transmission including the constant mesh gears 14.

Movement of arm 20 is effected by a link 21 which is pivoted to the end of an arm 22, secured to the end of a trunnion shaft 23. Trunnion shaft 23 is journaled in the cover 11 and, intermediate its ends, is formed with a yoke 24 within which a ball 25, on lever 16, is journaled. A cooperating bearing member 26 is secured to the yoke 24 to complete the bearing for the ball 25 and thus lever 16 is adapted to swing about the axis of trunnion shaft 23, as well as about the center of the ball 25.

In operation the shift lever 16 is moved laterally primarily to effect the selection of one of the shifter shafts 12. Prior to effecting such selection the trunion shaft 23 is rocked until the ball retainer or bearing 26 engages one of the opposed bosses 27. If, for example, the movement of lever 16 is toward the right, as viewed in Figure 1, the lever will be rocked about the center of trunnion shaft 23 until the ball retainer engages the right hand boss 27. This will result in a downward movement of arm 22 and link 21, and a corresponding movement of arm 20. During such movement, the pivot center of arm 20 and the axis of spring 19 coincide after which condition, continued movement of arm 20 causes arm 18ª to snap downwardly and shift clutch 15 into engagement with the mating clutch teeth of the right hand constant mesh gear. After the right hand boss 27 is engaged, the selection of the desired shifter shaft is completed and the lever 16 moved longitudinally of the device to perfect the shifting operation. It will thus be seen that a double side or lateral movement of the lever 16 is afforded in each position of the gears 13, as actuated by the shafts 12, and the standard shifting operations are thus supplemented by an increased range of speed changes afforded by the increased lateral manipulation of the shift lever.

The foregoing construction is simple and rugged in character, the parts being such that there is little likelihood of falling into disrepair and the operation of which is simple and positive.

While the invention has been described with specific reference to the accompanying drawings, it is not to be limited, save as defined in the appended claims.

We claim as our invention:

1. In combination with a plurality of transmission mechanisms and independent means to effect the operation of each, a single shifting lever, means on the lever to engage one of the independent means, a trunnion shaft, a ball mounting on the shaft to mount the lever, and means actuated by the shaft to operate another of the independent means.

2. In combination with a plurality of transmission mechanisms and independent means to effect the operation of each, a single shifting lever, means on the lever to engage one of the independent means, a trunnion shaft, a ball mounting on the shaft to mount the lever, an arm on the trunnion shaft, and means to actuate another independent means by the arm.

This specification signed this 24th day of April, A. D. 1931.

JOSEPH L. MATTHEWS.
STURE HERBERT LILJEROTH.